June 5, 1945.  E. G. MASCARENHAS  2,377,800
ELECTRO-PNEUMATIC LOOM
Filed Jan. 16, 1942    8 Sheets-Sheet 2
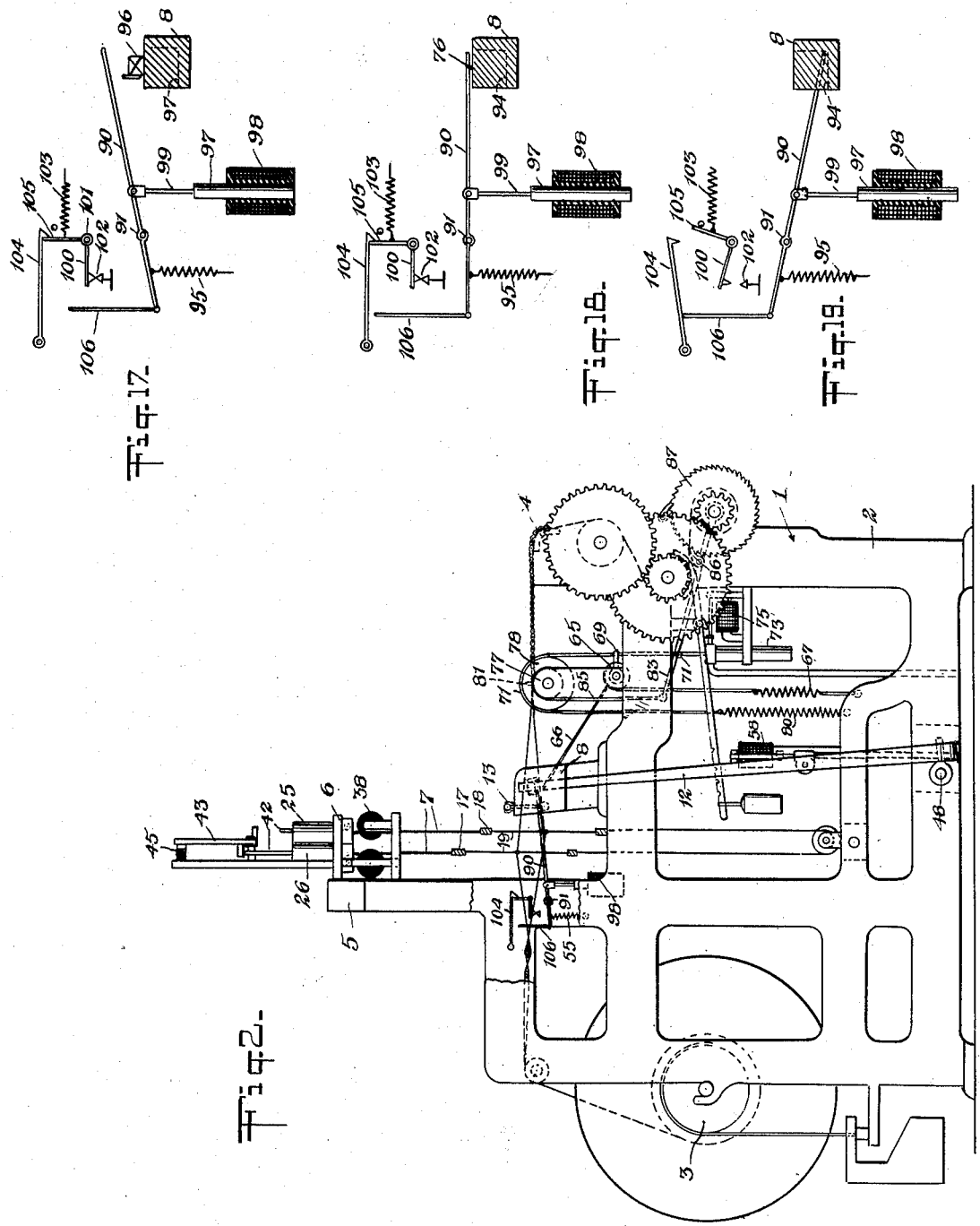
INVENTOR
*Eneas G. Mascarenhas*
BY
*Munn, Liddy, Glaccum & Kane*
ATTORNEYS June 5, 1945.  E. G. MASCARENHAS  2,377,800
ELECTRO-PNEUMATIC LOOM
Filed Jan. 16, 1942  8 Sheets-Sheet 3
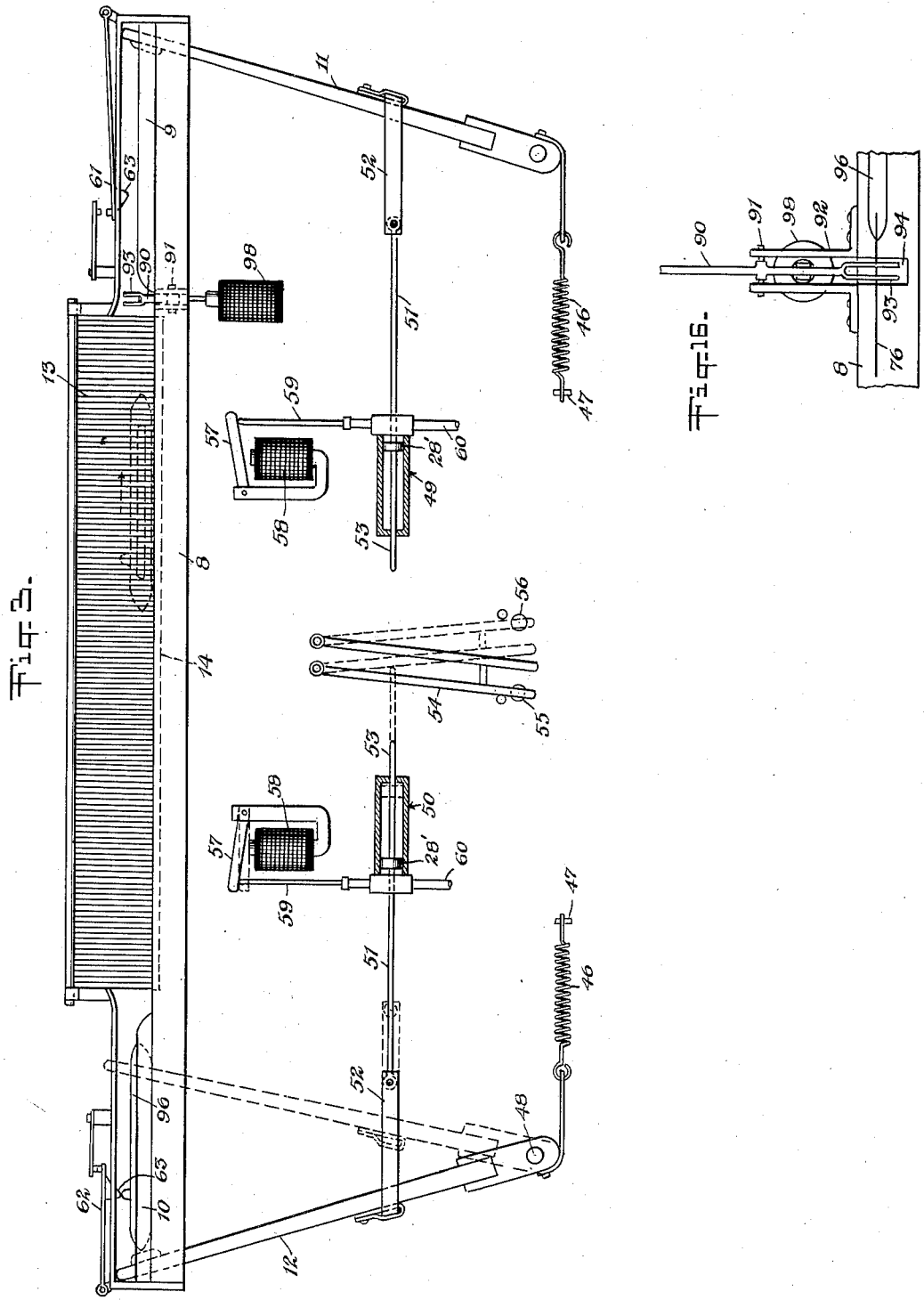
INVENTOR
Eneas G. Mascarenhas June 5, 1945.   E. G. MASCARENHAS   2,377,800
ELECTRO-PNEUMATIC LOOM
Filed Jan. 16, 1942   8 Sheets-Sheet 4
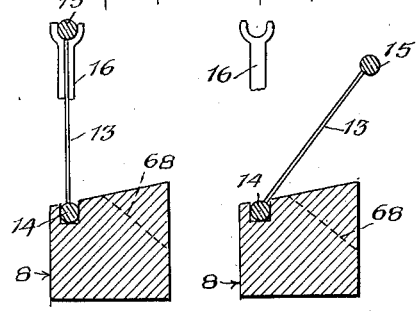
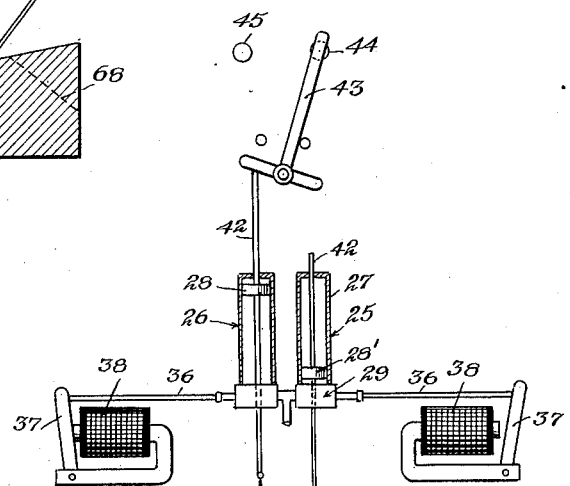
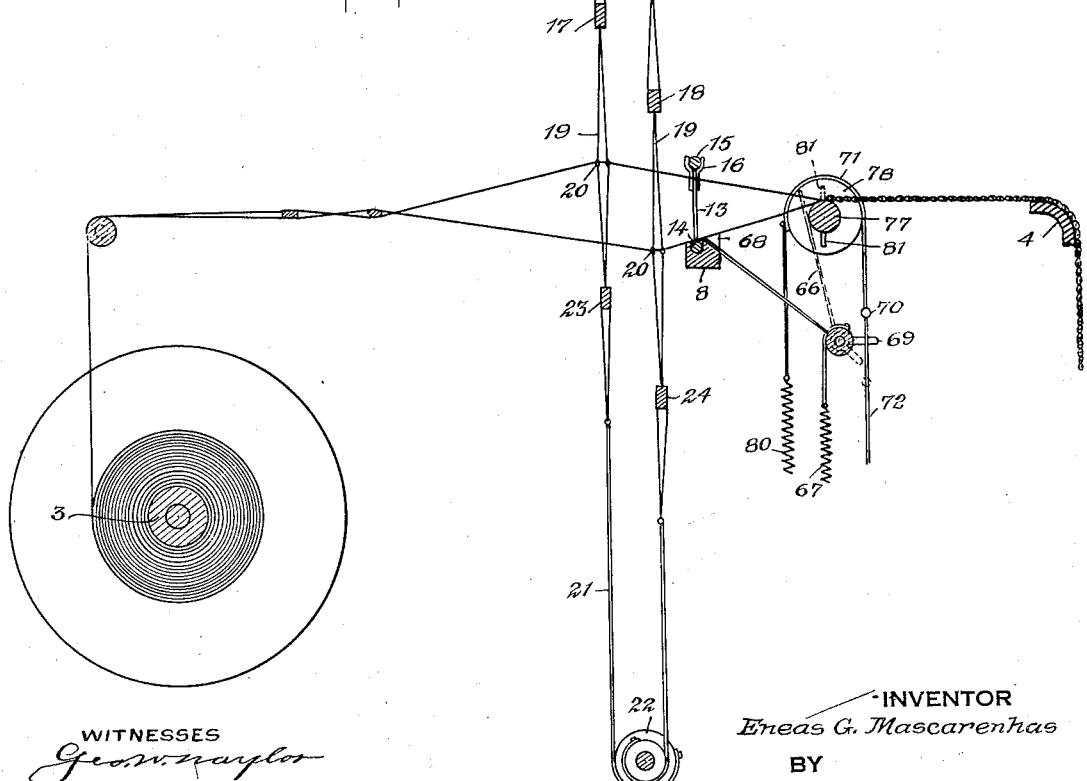
INVENTOR
Eneas G. Mascarenhas
BY
Munn, Liddy, Glaccum & Kane
ATTORNEYS
WITNESSES
Geo. W. Naylor June 5, 1945.  E. G. MASCARENHAS  2,377,800
ELECTRO-PNEUMATIC LOOM
Filed Jan. 16, 1942  8 Sheets-Sheet 5
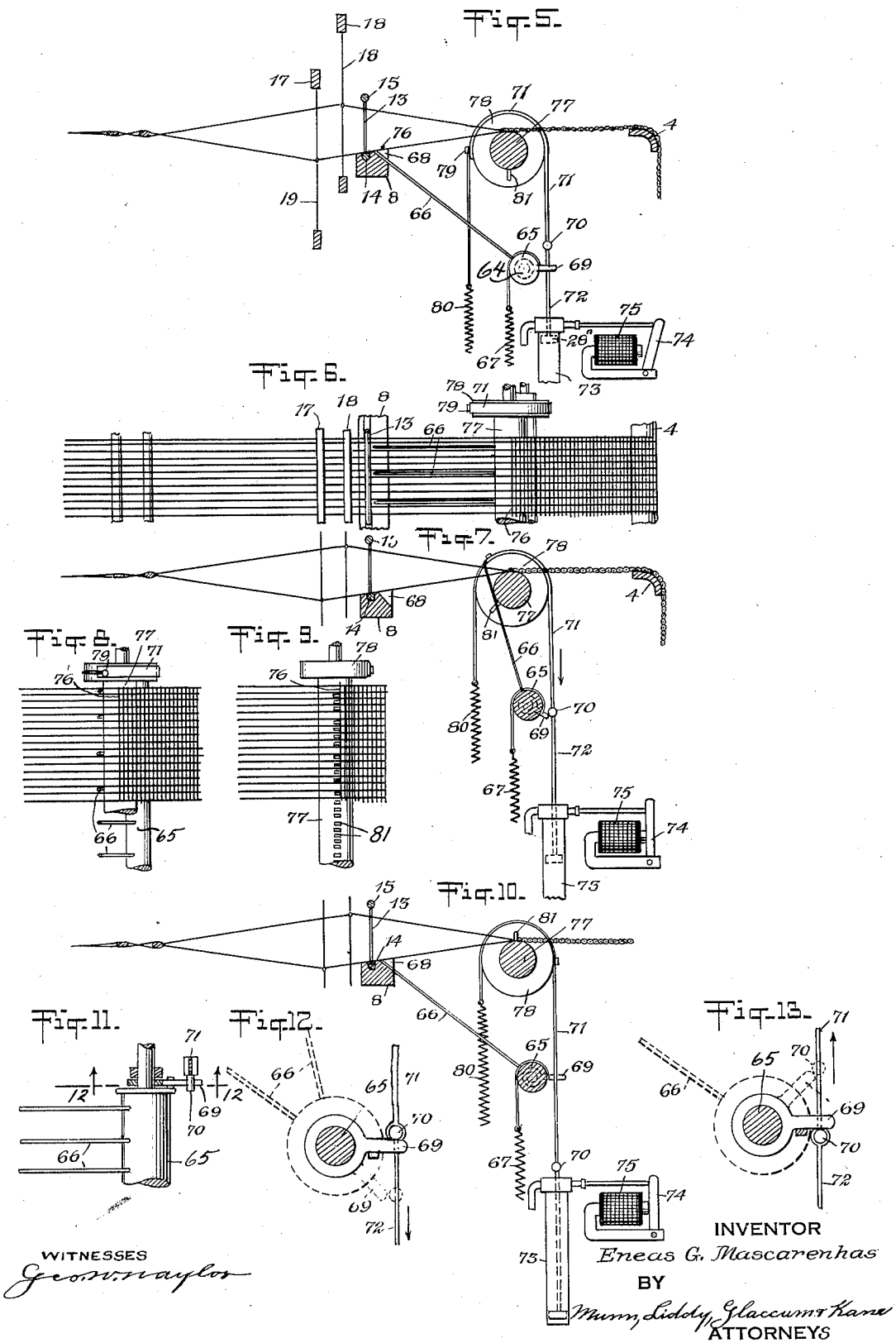
INVENTOR
Eneas G. Mascarenhas
BY
Munn, Liddy, Glaccum & Kane
ATTORNEYS

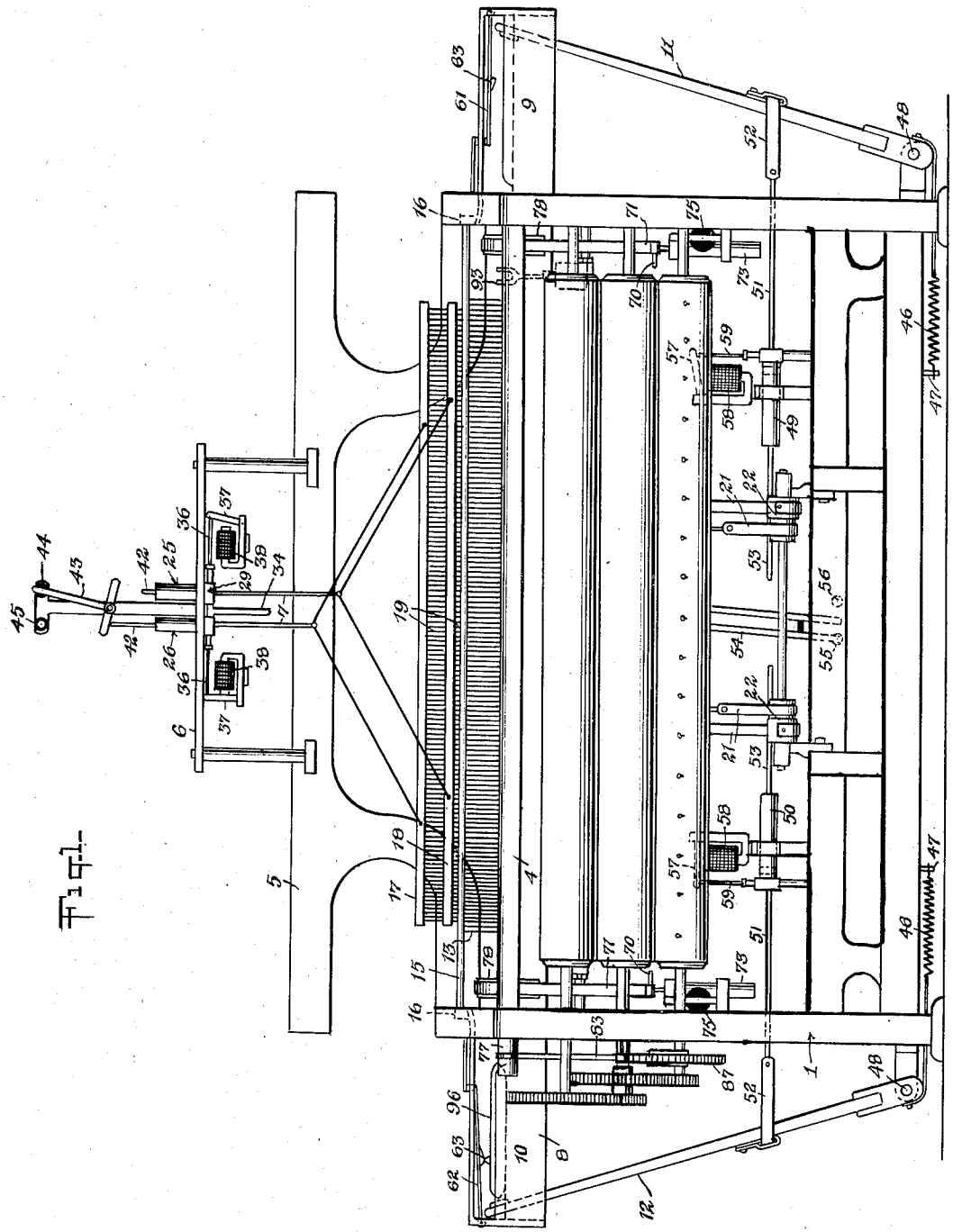

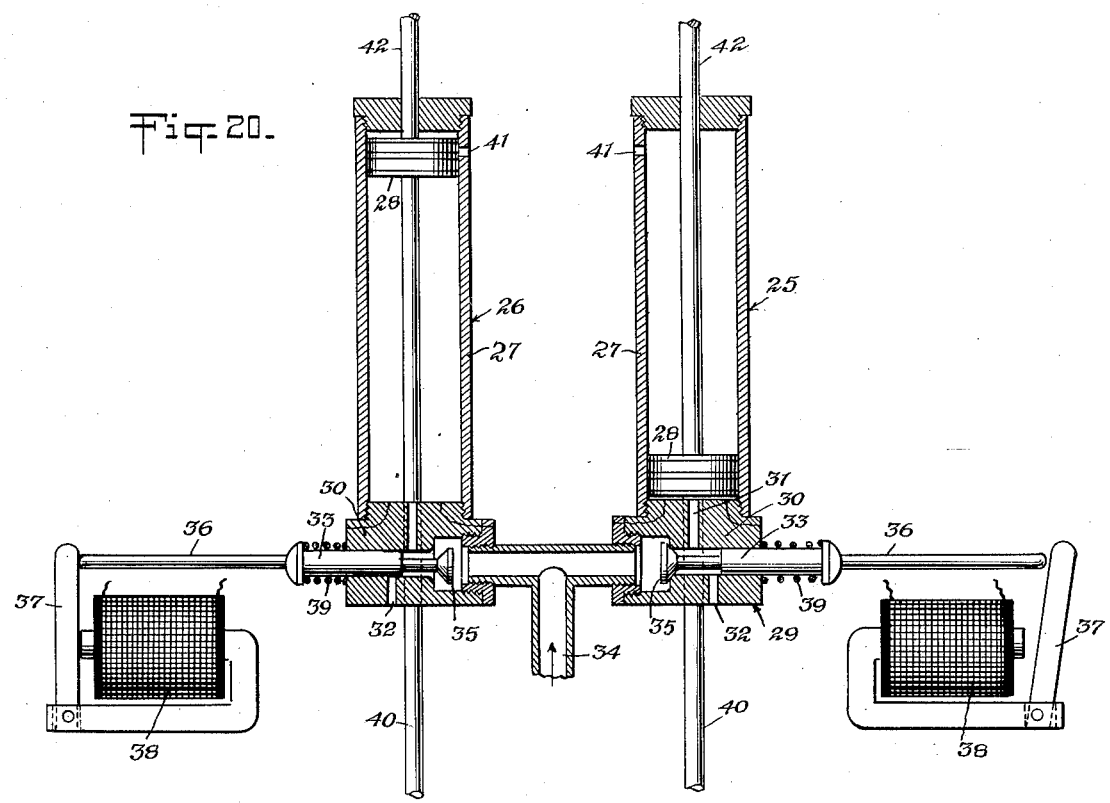
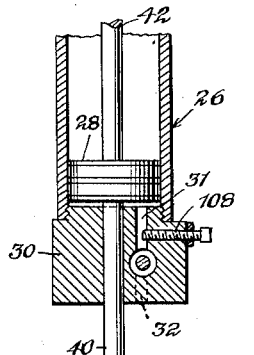
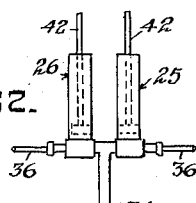
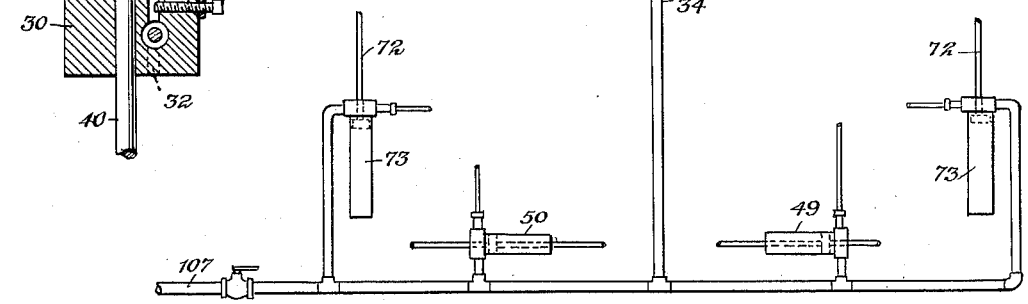

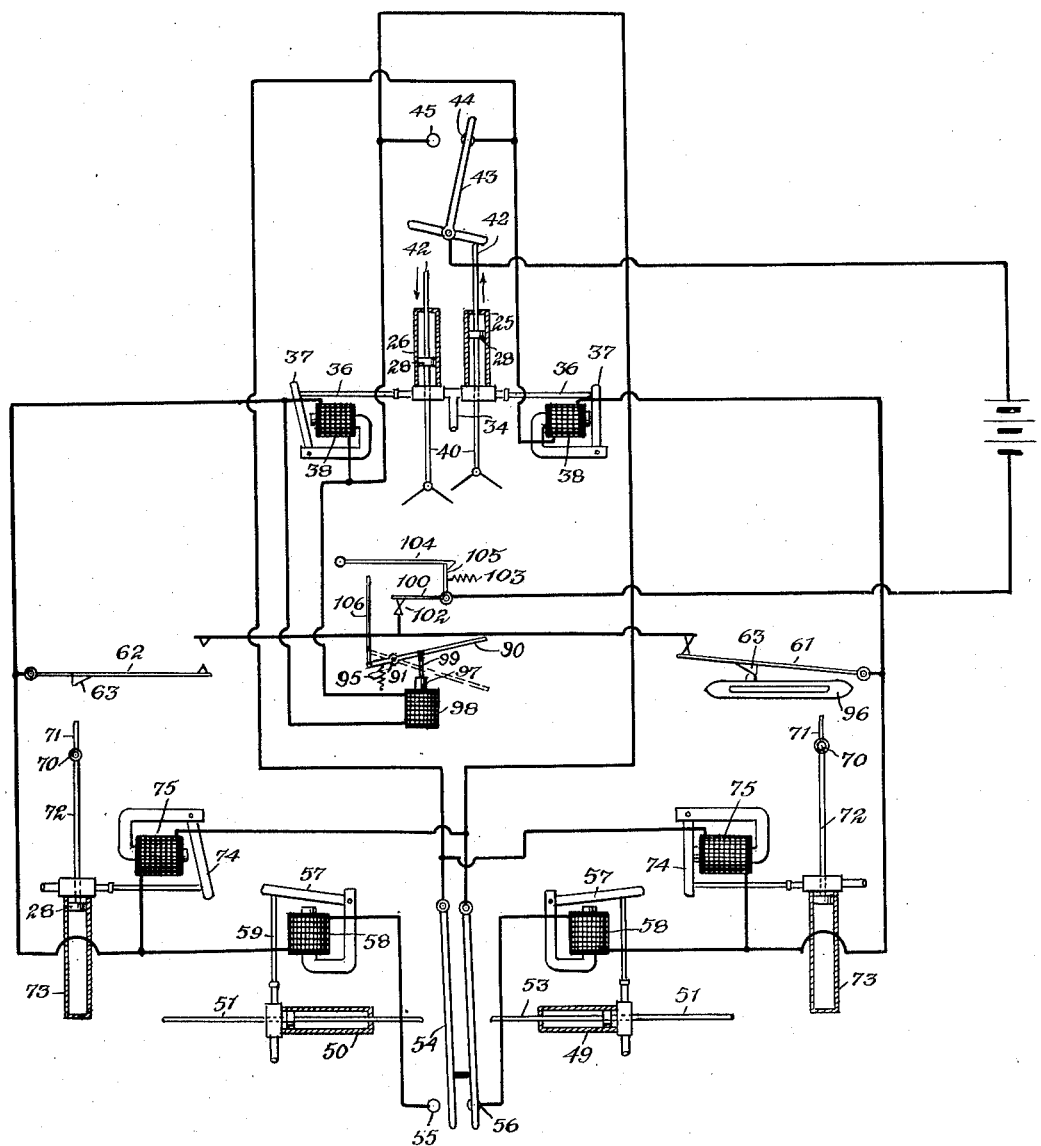

June 5, 1945.   E. G. MASCARENHAS   2,377,800
ELECTRO-PNEUMATIC LOOM
Filed Jan. 16, 1942   8 Sheets-Sheet 8

WITNESSES
Geo. W. Naylor

INVENTOR
Eneas G. Mascarenhas
BY
Munn, Liddy, Glaccum & Kane
ATTORNEYS

Patented June 5, 1945

2,377,800

UNITED STATES PATENT OFFICE 2,377,800

ELECTROPNEUMATIC LOOM

Eneas G. Mascarenhas, Minas, Brazil

Application January 16, 1942, Serial No. 426,963

16 Claims. (Cl. 139—11)

This invention relates to looms of the shuttle type and it has for its general object the provision of a loom characterized by simplicity in construction and operation; inherently lighter than known looms of commensurate cloth width and capacity, and comparatively free from inertia vibration of massive parts such as the lay which affects ordinary looms and necessitates that the loom frame be of heavy construction.

Another object of the invention is to provide a loom in which the lay is immovable and the beat-up is accomplished by parts which are relatively light and substantially rotationally balanced.

A further object of the invention is to provide a loom in which power is applied directly to the principal motions instead of being delivered serially from a single source of power by mechanical force-transmitting connections.

Another object of the invention is to provide for actuating the said principal motions by fluid pressure motors individual to each and operating said motors in proper timed relation, electrically through circuits under the chief command of a vital part of the loom, the shuttle.

Still another object of the invention is to provide for individual adjustments of the fluid pressure motors whereby precision in the proper timing and duration in the operation of the principal motions of the loom is obtained.

Another object of the invention is to provide a stop motion mechanism responsive to the failure of the weft yarn and which actuates a switch between the service line and the electrical controls for the several fluid pressure motors whereby the loom ceases to operate and remains inoperative while there is absence of a weft across the shuttle path.

Other objects of the invention will appear as the following description of a preferred and practical embodiment thereof proceeds.

In the drawings which accompany and form a part of the following specification and throughout the several figures of which the same characters of reference have been employed to designate identical parts:

Figure 1 is a view in front elevation of a loom embodying the principles of the subject invention;

Figure 2 is a side elevation;

Figure 3 is a front elevation of the lay including also the picker sticks and operating devices therefor;

Figure 4 is a side view in section illustrating the shed-forming and beat-up motions;

Figure 5 is a longitudinal vertical section somewhat diagrammatic illustrating the beat-up means and the electrically controlled fluid pressure operator therefor;

Figure 6 is a fragmentary plan view of the warp illustrating the transfer means for shifting the weft from the shuttle path to a point within reach of the beat-up mechanism;

Figure 7 is a view similar to Figure 5 showing the transfer means and beat-up mechanism in another position;

Figure 8 is a fragmentary plan view illustrating the transfer means with the weft thread in position to be engaged by the beat-up means;

Figure 9 is a view similar to Figure 8 showing the weft under the control of the beat-up means;

Figure 10 is a side view in vertical section similar to Figure 5 showing the beat-up means in its final position against the fell;

Figure 11 is a fragmentary view partly in horizontal section and partly in plan illustrating the transfer fingers;

Figure 12 is a cross section taken along the line 12—12 of Figure 11;

Figure 13 is a view similar to Figure 12 showing the transfer mechanism in another position;

Figures 14 and 15 are sectional views through the lay and reed showing the latter respectively in active and tilted position;

Figure 16 is a plan view of the stop motion mechanism;

Figure 17 is a side elevation partly in section showing the stop motion fork elevated to permit passage of the shuttle along the lay;

Figure 18 is a similar view showing the stop motion fork in normal position held by the interposition of a weft yarn between the fork and lay;

Figure 19 is a similar view showing the stop motion fork in its fallen position assumed in the absence of the interposed weft yarn;

Figure 20 is a vertical section through the fluid pressure motors and valves which actuate the shed-forming mechanism;

Figure 21 is a detail view in section illustrating the individual adjustment of the fluid pressure motors;

Figure 22 is an elevational view largely diagrammatic showing the fluid pressure system which actuates the principal motions of the loom;

Figure 23 is a diagrammatical layout of the electrical system by means of which the several motions are controlled and timed with the shuttle in the right hand box.

Figure 24:
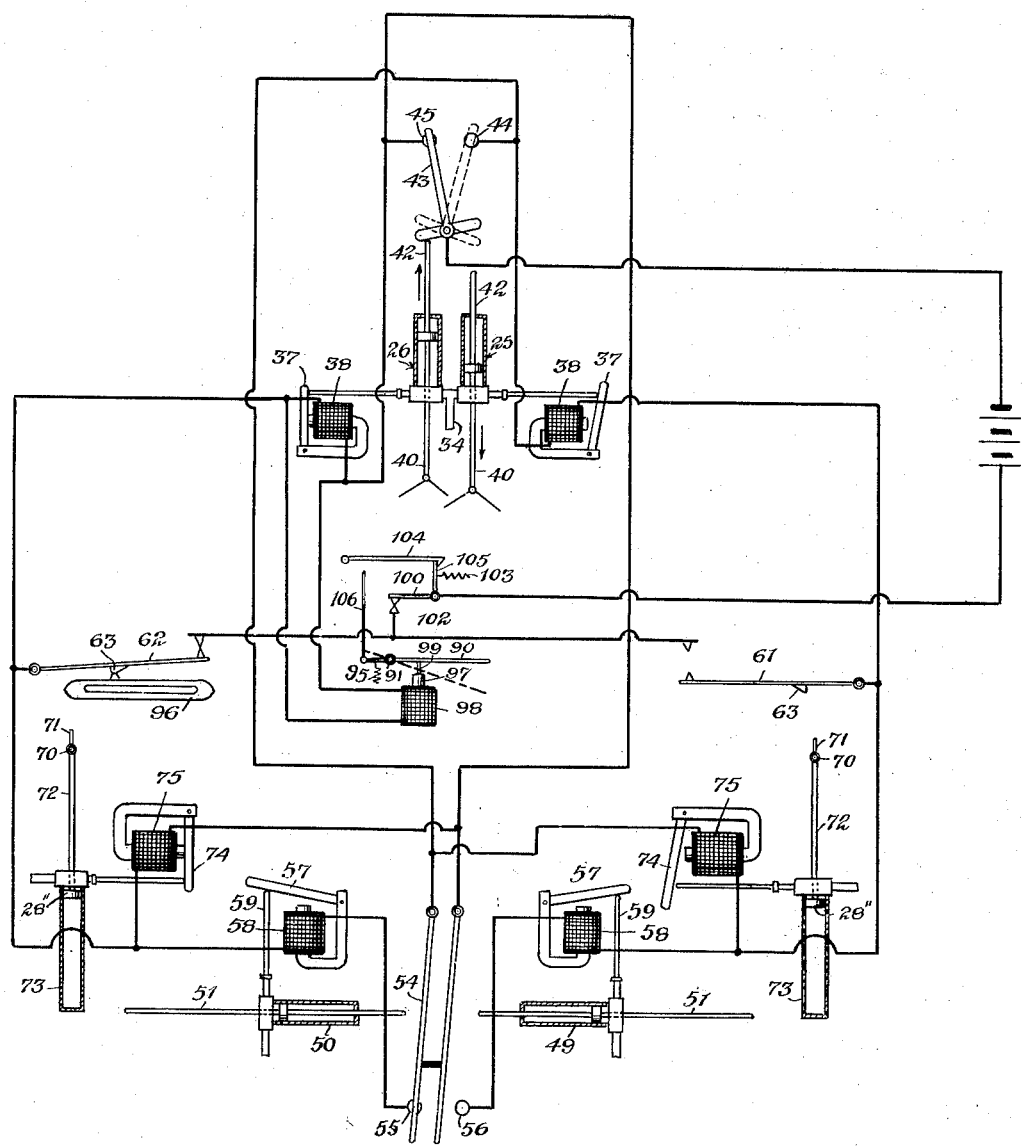
Figure 24 is a similar view with the shuttle in the left hand box.

Referring now in detail to the several figures, the numeral 1 represents in general the loom having a frame 2 supporting the warp beam 3 and the breast beam 4, having an upright portion 5 carrying a bracket 6 which supports the shed-forming mechanism in general designated by the reference character 7. A lay 8 extends transversely across the frame 2 which contrary to the lay of the conventional loom is fixed and does not oscillate so as to participate in the beat-up operation.

The details of the lay 8 are best shown in Figure 3 in which respective shuttle boxes 9 and 10 are shown at the right and left sides of the lay, each shuttle box being served by the respective picker sticks 11 and 12. Inasmuch as the lay is fixed the picker sticks merely oscillate in a single plane. A reed 13 is positioned on the lay along its intermediate portion, said reed having its lower rib 14 oscillatably mounted in a longitudinal groove in the lay as illustrated in Figures 14 and 15. The top rib 15 of the reed extends beyond the ends of the reed and is supported in forked brackets 16 fixed to the lay adjacent the ends of the reed. The reed 13 may be conveniently swung to an inclined position as shown in Figure 15 out of the way of the harness of the shed-forming mechanism when it becomes necessary to mend the warp by passing it through the eyes in the harness. To move the reed from its erect to its inclined position, it is necessary merely to lift the upper rib 15 out of the forked bracket 16 and tilt the reed.

Referring now to the shed-forming mechanism, this comprises in the illustrated embodiment of the invention the suspended heddle bars 17 and 18 which carry the usual harness 19 having the eyes 20 through which the warp yarns are threaded. The heddle bars and harness are interconnected by a cord or cable 21 which passes beneath a roller 22 and joins the lower heddle bars 23 and 24. Thus when one heddle goes up the other comes down separating the shed. When it is desired to get both sets of eyes 20 in alignment it is merely necessary to press the hand on the top of the higher heddle bar 17, bringing both heddle bars into level position.

The heddles are operated individually by the fluid pressure motors 25 and 26, each consisting of a cylinder 27, a piston 28 and a valve 29 for admitting fluid to the lower side of the piston. The details of the fluid pressure motors are best shown in Figure 20 in which the valve which serves the motor is shown as a fitting 30 having an inlet port 31 to the piston chamber, a vent 32 to atmosphere and a valve barrel 33 closing or opening the communication between the cylinder, said inlet port and vent. A conduit 34 from a suitable source of fluid under pressure communicates with the valve chambers of both motors 25 and 26, a valve 35 in each chamber serving to open or close communication between the conduit 34 and the piston chamber of the respective motors 25 and 26. Each of the valves 33 and 35 is on a stem 36 which projects from the fitting 30 into operative proximity to the armature 37 of an electro-magnet 38. The valves 29 and 35 are normally maintained in position to exclude fluid pressure from the piston chambers and to keep the piston chambers open to atmosphere by springs 39. When the valves are in this position each piston 28 is at its lowermost position. The pistons have rods 40 extending downwardly through the lower ends of the cylinders 27 from which rods the heddles are suspended. The magnets 38 are alternately energized so that when fluid pressure is admitted to the cylinder of one motor it is excluded from the other. Thus one piston 28 will be at its lowermost position while the other is at the top of its cylinder so that one of the heddles will be up while the other is down.

Figure 20 shows that there is a vent 41 in each of the cylinders near the top of the stroke of the pistons. This vent permits the air in the cylinders to be exhausted upon the up-stroke of the pistons until the vents 41 are occluded by said pistons. The residual air trapped above said pistons then acts as a cushion to prevent shocks.

It will be understood that while I have herein shown a shedding for plain weave, it will be understood to those skilled in the art that the reciprocating motion imparted by the pistons of the fluid pressure motors can easily be put to work in a dobby or a Jacquard loom to produce any other weave.

It will be observed particularly in Figures 4, 23 and 24 that the pistons 28 have rods 42 extending upwardly beyond the cylinders 27 and which alternately shift a switch 43 from the contact 44 in one electrical circuit to the contact 45 in an alternate circuit for a purpose which will presently appear.

It will be understood that inasmuch as the lay and reed in the subject loom are not oscillating parts, but fixed, the heddles can work close to the reed and the depth of the shed may be reduced considerably so that very little strain in consequence is put upon the warp.

Picking follows shedding and is one of the most delicate motions of a loom and in the ordinary loom in which the lay including the reed and shuttle boxes oscillates in effecting the beat-up, it is by far the most dangerous part of the machine and more serious accidents result from defective picking than from all of the remaining parts of the loom taken together. The loom of the present invention practically eliminates this danger for the operation of picking is reduced to the simple passing of the shuttle containing the weft between the upper and lower planes of the shed from a shuttle box at a fixed station on one side to a shuttle box at a fixed station on the opposite side.

In Figure 3 the picker sticks 11 and 12 are shown normally urged to their outermost position by means of the springs 46 which are tensioned between a fixed point of anchorage 47 and the lower ends of the picker sticks below their pivots of oscillation 48. The picker sticks are operated by fluid pressure motors 49 and 50 which may be in all respects similar to the motors specifically shown and described in connection with Figure 20 and the pistons 28' of which have rods extending from both ends, one rod 51 of each being connected by the straps 52 to the picker stick and the other rod 53 of each being extended so as alternately to make contact with a switch 54 for moving it from the contact 55 of one circuit to the contact 56 of another circuit as will presently be explained. The valves of the fluid pressure motors 49 and 50 are actuated by the armatures 57 of the alternately energized electro-magnets 58 acting through the valve stems 59. Fluid pressure is supplied to the motors 49 and 50 through the conduits 60.

Figure 3 shows also that similar switches 61 and 62 are positioned adjacent the respective shuttle boxes having portions 63 projecting into the shuttle boxes to be engaged by the shuttle.

When the shuttle enters either of the shuttle boxes it displaces the projecting portion 63 outward and closes the associated switch. The function of these switches will be described in connection with the electrical systems which energize the several electro-magnets and time their relative operation. The shuttle is the vital element through which the regular sequence of motions is produced and controlled.

Since the lay and reed occupy a fixed position adjacent the heddles and do not oscillate toward the fell of the fabric in performing the beat-up operation as is the case in ordinary looms, there is quite a distance between the shuttle path and the end of the shed represented by the fell so that special means must be provided for transferring the weft from the shuttle path to a point where it can be engaged by beat-up mechanism and pressed into the fell.

The series of Figures 5 to 13 inclusive, illustrate such mechanism. Referring, for example, to Figure 5, a shaft 64 is shown carrying a drum 65 from which a series of fingers 66 project, said series extending across the shed and operating through the lower plane of the shed. The drum 65 is urged by the spring 67 to a rotative position in which the ends of the fingers 66 lie in grooves 68 formed in the lay directly beneath the path of the shuttle. A lug 69, see Figures 5 and 11, projects from the drum 65 into the path of a roller 70 carried laterally of a flexible band 71, the lower end of which is connected to the rod 72 extending from the piston 28" of the fluid pressure motor 73. The valve of this motor is actuated by the armature 74 of an electro-magnet 75. When fluid pressure is admitted to this motor the piston descends pulling upon the band 71 bringing the roller 70 into contact with the lug 69, oscillating the drum 65 in opposition to the spring 67 so as to move the fingers 66 through the warp from their repose position in the grooves of the lay to a point adjacent the fell. The fluid motor 73, electro-magnet 75 and the operating connections to the transfer mechanism and beat-up mechanism are duplicated for each of the circuits controlled by the shuttle from its positions in its respective boxes. In executing this movement the fingers engage the weft yarn 76 which lies in the shuttle path and carry it over to a point adjacent the fell where it will be engaged by the beat-up mechanism.

The beat-up mechanism comprises a drum 77 supporting the fell having a pulley 78 partially surrounded by the band 71 which is suitably secured thereto as at the point 79. The drum 77 and pulley 78 are urged to a normal position of repose by the spring 80. The drum has a beat-up comb 81 projecting from one side thereof and when the drum is in repose position the beat-up comb is in inactive position as shown in Figure 5. Upon rotation of the drum the beat-up comb 81 projects through the warp and engages the weft yarn 76 which has been placed in its path by the fingers 66 of the transfer mechanism. The purpose of the pulley 78 is to give the beat-up comb 81 a movement of minor amplitude while the band 71 is travelling downward a considerable distance so that the roller 70 will actuate the transfer mechanism to transfer the weft thread from the shuttle path to the position where it can be engaged by the beat-up comb and to cause the roller 70 to pass to the opposite side of the lug 69 as shown in Figure 12, permitting the transfer fingers to snap back to their repose position under the urge of the spring 67 before the beat-up comb has reached the position of engagement with the weft yarn 76. When the beat-up comb 81 engages the weft yarn 76 the piston 28" of the motor 73 is still descending so that the beat-up comb 81 presses the weft yarn firmly into the fell.

When the fluid pressure in the motor 73 is released the beat-up comb together with the drum 77 and pulley 78 return to their repose position under the urge of the spring 80, the fingers 66 of the transfer mechanism having already snapped back to their repose position before the beat-up operation has been completed in readiness for the passage of the shuttle in the opposite direction.

The cloth take-up mechanism is of known type, operated by the conventional pawl and ratchet drive represented in the drawings by the ratchet wheel 87 and driving pawl 86 engageable therewith. In the subject invention, as shown, the driving pawl is carried by a lever 83, oscillatable coaxially of the ratchet wheel by means of a flexible band 85 secured thereto and to the drum 77 (see Figure 2), and moving responsive to the oscillations of said drum.

The stop motion comprises a forked lever 90 intermediately pivoted at 91 to a bracket 92 carried by the lay and having its tined end 93 normally overlying a depression 94 formed in the lay beneath the shuttle path. As shown in Figure 18 the weft yarn 76 laid by the shuttle along the top of the lay intervenes between the tined lever 90 and the depression 94 maintaining the lever 90 in the position shown. A spring 95 normally holds the lever 90 tilted upwardly as shown in Figure 17, making room for the shuttle 96 to pass. The lever 90 is drawn down by the armature 97 of a solenoid 98, said armature being pivotally connected to the lever 90 by the link 99. The solenoid 98 is of mild strength so that when energized it pulls the lever 90 to the position shown in Figure 18, further downward movement of the lever being stopped by the weft yarn 76. When the shuttle runs out or if the weft thread breaks the lever 90 falls into the depression 94 through the pull of the solenoid 98. The arm 100 of a rocking lever 101 forms the movable contact of a normally closed switch 102. Said switch is constantly urged to open position by a spring 103, but is normally prevented from opening by a pivoted hook 104 which engages the other arm 105 of the rocking lever. An upwardly directed striker 106 is connected to the opposite end of the lever 90 and which operates to engage the hook when the lever 90 falls into the depression 94 upon failure of the weft thread, lifting the hook and thereby causing the switch 102 to open under the urge of the spring 103. This switch, as will be seen, is in the main circuit from the service line which feeds the electrical instrumentalities by which the various motions of the loom are operated and controlled and when this switch opens the current is cut off and the loom ceases to operate. In order to restore operation it is necessary that the shuttle be in its proper box with the weft thread extending across the depression 94 and that the rocking lever be latched beneath the hook 104, reclosing the switch 102.

Referring now to the electrical circuits shown in Figures 23 and 24 and first adverting to that shown in Figure 23 in which the shuttle 96 is in the right hand box, the switch 61 being closed thereby. This closes a circuit from the battery through the rocking switch 43 through the electro-magnet 38 admitting fluid to the motor 25 raising the piston and lifting the corresponding heddle. At the same time a circuit is closed through the electro-magnet 75 on the right hand side operating the fluid pressure motor 73 which actuates the transfer and beat-up mechanism. Transfer and beat-up take place at the same time as the shedding. When the piston 28 of the motor 25 reaches the top of its stroke the rod 42 knocks the switch 43 over from the contact 44 to the contact 45 closing the circuit through the electro-magnet 58 which controls the motor 49 that actuates the right hand picker stick. The actuation of this motor causes the rod 53 to knock the switch 54 from the contact 56 to the contact 55. In the meantime the shuttle 96 has been thrown by the picker stick into the left hand box closing the switch 62. The circuit sequences may now be traced from Figure 24, the switch 62 being shown closed in this figure. Current passes from the battery through the closed stop motion switch 102, the closed switch 62 through the left hand electro-magnet 38 operating the motor 26 which raises the associated heddle. When one heddle goes up the other goes down due to the interconnection afforded by the cable 21 previously described and illustrated in Figure 4 and when one piston 28 goes up the other is pulled down by the descending heddle. At the same time a circuit is closed through the left hand electro-magnet 75 actuating the associated fluid pressure motor 73 which operates the transfer and beat-up mechanism. When the piston 28 of the motor 26 has approached the top of its stroke it moves the rocking switch 43 over to the dotted line or original position indicated in Figure 24. This closes a circuit through the left hand electro-magnet 58 actuating the fluid pressure motor 50 which operates the left hand picker stick and at the same time throws the switch 54 back to its original position.

It will be observed that the solenoid 98 is in parallel circuit with one of the electro-magnets 38 which operate the shedding mechanism so that the tined lever 90 is drawn down into testing position with respect to the weft thread 76 once on every other pick.

Referring to Figure 22, it will be observed that the motors 25 and 26 which serve the shed-forming motion, the motors 49 and 50 which actuate the picker sticks and the motors 73 which operate the beat-up mecahnism are all supplied with fluid pressure from a single source, not shown, connected to the main conduit 107 having branch conduits leading to the respective motors. As all of these motors discharge their spent air through the vents 32 into the atmosphere of the weaving room the air may be supplied to the motors properly humidified and conditioned to give the best results, both as to the weaving and the comfort and health of the workers.

It will be understood from the above invention that the fluid pressure motors act directly and independently upon the several motions which they actuate and that they are properly timed as to sequence of operation by the electrical instrumentalities through which their valves are actuated. In order to gain greater precision in their timing and duration of operation, the influx of air into the several piston chambers may be independently regulated by means such as the set screw 108 which intersects the inlet port 31 leading to each piston chamber. The piston travel of each fluid pressure motor may be accelerated or delayed as may be desired by independent adjustments of these set screws.

While I have in the above description disclosed what I believe to be a preferred and practical embodiment of my invention, it will be understood to those skilled in the art that the specific details of construction as shown and described are by way of example and not to be construed as limiting the scope of the invention as defined in the appended claims.

What I claim is:

1. A loom including warp-supporting, shed-forming, shuttle-picking, and beat-up means, and a non-oscillatable lay including a normally fixed stationary reed, said beat-up means comprising a comb operating through the warp adjacent the fell and remote from the lay, and means for transferring the weft pick from the region of the lay to a point within the operative range of movement of said beat-up comb.

2. A loom including warp-supporting, shed-forming, shuttle-picking and beat-up means, and a non-oscillatable lay adjacent the shed including a normally fixed stationary reed, said lay having a shuttle box at each of its ends, said beat-up means comprising an oscillating comb operating through the warp adjacent the fell and remote from the lay, and means for transferring the weft pick from the region of the lay to a point within operative range of said beat-up comb including a series of oscillating fingers operating through the warp having their free ends normally lying adjacent the lay beneath the shuttle path.

3. A loom including warp-supporting, shed-forming, shuttle-picking, and beat-up means, and a non-oscillatable lay adjacent the shed including a normally fixed stationary reed, said lay having a shuttle box at each of its ends, said beat-up means comprising an oscillating shaft with comb teeth operating through the warp adjacent the fell and remote from the lay, and means for transferring the weft pick from the region of the lay to said transfer means comprising a shaft, a series of oscillating fingers carried by the shaft operating through the warp having their free ends normally lying in recesses in the lay beneath the shuttle path, and having an amplitude of sweep of a magnitude to carry the weft pick to a point within operative range of said beat-up means, and means for operating said transfer means shaft and said beat-up means shaft in sequence.

4. A loom including warp-supporting, shed-forming, shuttle-picking, and beat-up means, and a non-oscillatable lay adjacent the shed including a normally fixed stationary reed, said lay having a shuttle box at each of its ends, said beat-up means comprising an oscillatable shaft, comb teeth carried by said shaft operating through the warp adjacent the fell and remote from the lay, and means for transferring the weft pick from the region of the lay to said transfer means comprising a shaft, a series of oscillating fingers carried thereby, operating through the warp having their free ends normally lying in recesses in the lay beneath the shuttle path, and having an amplitude of sweep of a magnitude to carry the weft pick to a point within operative range of said beat-up means, and operating means connected to said beat-up means shaft for oscillating it in beating up direction, said operating means being freely engageable with said transfer means shaft for oscillating the latter, at an intermediate point in the movement of said operating means, said fingers and said comb teeth being so relatively displaced on their respective shafts that the fingers with the weft pick precede the comb teeth in reaching the point of weft transfer.

5. A loom including warp-supporting, shed-forming, shuttle-picking and beat-up means, and a fixed lay adjacent the shed including a normally fixed stationary reed, said lay having a shuttle box at each of its ends, said beat-up means comprising an oscillating drum supporting the warp at the fell, comb teeth carried by said drum operating through the warp adjacent the fell, and means for transferring the weft pick from the region of the lay to a point within operative range of said comb teeth, comprising an oscillating shaft, a series of fingers carried thereby, operating through the warp, having their free ends normally lying adjacent the lay beneath the shuttle path and having an amplitude of sweep of such magnitude as to carry the weft pick to a point within operative range of said comb teeth, and means for oscillating said drum in a beating up direction, said means being freely engageable with said transfer means shaft for oscillating the latter at an intermediate point in the movement of said means, and a fluid pressure motor for actuating said oscillating means, said fingers and said comb teeth being so relatively displaced on the respective shaft and drum that the fingers with the weft pick precede the comb teeth in reaching the point of weft transfer.

6. A loom including warp-supporting, shed-forming, shuttle-picking and beat up means, and a fixed lay adjacent the shed including a normally fixed stationary reed, said lay having a shuttle box at each of its ends, said beat-up means comprising an oscillating drum supporting the warp at the fell, comb teeth carried by said drum operating through the warp adjacent the fell, and means for transferring the weft pick from the region of the lay to a point within operative range of said comb teeth, comprising an oscillating shaft, a series of fingers carried thereby, operating through the warp, having their free ends normally lying adjacent the lay beneath the shuttle path and having an amplitude of sweep of such magnitude as to carry the weft pick to a point within operative range of said comb teeth, and means for oscillating said drum in a beating up direction, said means being freely engageable with said transfer means shaft for oscillating the latter at an intermediate point in the movement of said means, said fingers and said comb teeth being so relatively displaced on the respective shaft and drum that the fingers, with the weft pick precede the comb teeth in reaching the point of weft transfer.

7. A loom including warp-supporting means and a lay having a shuttle-operated switch at each end, alternately operating picker means at the ends of the lay, alternately operating shed-forming means, and beat-up means operating for each pick, fluid pressure motors individual to said picker means, shed-forming means and beat-up means, for operating the same, connected to a common source of fluid pressure, solenoids for controlling said motors and electrical connections for sequentially and co-ordinately actuating said solenoids, comprising circuits, each including one of said shuttle-operated switches, whereby said circuits are alternately energized by shift in the position of the shuttle, each of said circuits including the solenoid of one shed-forming means and a solenoid of the beat-up means so that each of said circuits when energized simultaneously actuates the shed-forming means and beat-up means, and circuits, each including the solenoid of one of said picker means, alternately energized in such phase that the circuit of the picker means adjacent the shuttle is open during at least the initial part of the period of energization of the closed shuttle switch circuit, a switch controlling both said picker means solenoid circuits tripped by the actuated shed-forming means motor to close the circuit of the adjacent picker means solenoid and open the circuit of the opposite picker means solenoid, and a second switch common to both picker means solenoid circuits normally closing a gap in the circuit of the actuated picker and tripped by the motor associated with the picker circuit whose gap it closes for opening said gap and closing a gap in the opposite picker-actuating circuit.

8. A loom including the principal motions, namely alternately operating shed-forming means, alternately operating picker means, a shuttle operated thereby, and beat-up means operating for each pick, an electrical control for effecting the sequential and co-ordinated operation of said principal motions comprising solenoids for each of said motions and electrical connections for said solenoids comprising circuits each including a switch, said switches being respectively closed by the shuttle at opposite ends of its path of travel whereby said circuits are alternately energized, each of said circuits including the solenoid of one shed-forming means and a solenoid of the beat-up means so that each of said circuits when energized simultaneously actuates the shed-forming means and beat-up means associated therewith, and the circuits, each including the solenoid of one of said picker means, alternately energized in such phase that the circuit of the picker means adjacent the shuttle is open during the period of energization of the closed shuttle switch circuit, a switch controlling both of said picker means solenoid circuits tripped responsive to the actuation of the shed-forming means which is operated through the then closed shuttle switch circuit, to close the circuit of the adjacent picker means solenoid and open the circuit of the opposite picker means solenoid, and a second switch common to both picker means solenoid circuits, normally closing a gap in the circuit of the actuated picker solenoid and tripped responsive to the actuation of that picker for opening said gap and closing a gap in the opposite picker-actuating means solenoid circuit.

9. A loom including the principal motions, namely shed-forming means, beat-up means and picker means and a shuttle operated by said picker means, fluid pressure motors individual to said means for operating them, deriving their fluid pressure from a common source, said motors each including valve mechanism for admitting fluid pressure thereto, cutting it off and venting said motors, electro-magnets for actuating said valves, and circuits for energizing said electro-magnets in proper sequence and co-ordination, said circuits being controlled by said shuttle in the respective end positions of its path of travel.

10. A loom as claimed in claim 9, including means for each motor for adjusting the admission of fluid pressure thereto, whereby the sequence and co-ordination of operation of the several motions may be precisely correlated.

11. A loom as claimed in claim 7, including a stop motion switch in the common line circuit which feeds both shuttle switch circuits, and means for causing said stop motion switch to open responsive to failure of the weft pick.

12. A loom including a fixed lay with a shuttle closed switch at each end, said switches being in alternately energized circuits which control reversals of the shed and a beat-up for each pick, picker sticks operating at each end of the lay, alternately actuated fluid pressure motors for moving said picker sticks in the direction of their pick stroke, a spring for each picker stick for retracting the same, each fluid pressure motor comprising a cylinder, with piston therein having a connecting rod extending therefrom at one end connected to the adjacent picker stick, and a push rod extending from the opposite end, a valve for each cylinder for admitting fluid pressure thereto, cutting it off, and venting said cylinder, a solenoid for each motor for operating its valve, said solenoids being in circuits respectively related to the shuttle switch circuits in such phase as to operate only after energization of the respective circuits controlling the shed-reversal and beat-up means, said picker stick motor solenoid circuits each having two gaps in series, and common switches one for each pair of corresponding gaps of both circuits for alternately closing one and opening the other, one switch being shifted responsive to the operation of the shed-reversing means, the other being shifted by the push rods of said picker stick motors, for opening the circuit of the solenoid of the picker stick motor just actuated and closing the corresponding gap in the other picker stick solenoid circuit in readiness for that circuit to be closed by the shed-reversing means actuated switch.

13. A loom including oppositely reciprocable shed-forming means flexibly connected at their lower ends about a direction changer whereby when one is lifted the other is depressed, fluid pressure motors individual to said shed-forming means, connected thereto for alternately lifting them, a lay, picker sticks at opposite ends of said lay, fluid pressure motors individual thereto for alternately operating said picker sticks, individual solenoids for controlling said motors, said shed-forming means solenoids being in circuits including shuttle-operated switches at opposite ends of the lay, alternately closed by the shuttle when in its end positions on the lay, circuits including said picker stick solenoids, each shuttle switch circuit and the opposite picker stick solenoid circuit having a common terminal, a switch connected in circuit with a source of electrical energy operatively related to both common terminals, and alternately actuated by the shed-forming means motors, when operated, to supply current to one or the other of said common terminals, said source switch normally contacting the common terminal which includes the shed-forming means solenoid circuit next to be closed by the shuttle, said picker stick solenoid circuits having gaps, a shift switch commonly related to said gaps, alternately actuated by the picker stick operating motors for alternately closing and opening said gaps, said shift switch normally closing the gap of that picker stick solenoid circuit which is next to be closed by the operation of said source switch.

14. A loom including oppositely reciprocable shed-forming means, flexibly connected at their lower ends about a direction changer whereby when one is lifted the other is drawn down, fluid pressure motors individual to said shed-forming means, connected thereto for alternately lifting them, a lay, picker sticks at opposite ends of said lay, fluid pressure motors individual thereto for alternately operating said picker sticks, individual solenoids for controlling said motors, said shed-forming means solenoids being in circuits including shuttle-operated switches at opposite ends of the lay, alternately closed by the shuttle when in its end positions on the lay, circuits including said picker stick solenoids, each shuttle switch circuit and the opposite picker stick solenoid circuit having a common terminal, a switch connected to a source of electrical energy operatively related to both common terminals, and alternately actuated by the shed-forming means motors, when operated, to supply current to one or the other of said common terminals, said source switch normally contacting the common terminal which includes the shed-forming means solenoid circuit next to be closed by the shuttle, a normally closed stop motion switch intercalated in the connection between said source of current and said source switch, a stop motion mechanism comprising a lever mounted to swing through an arc which intersects the path of the weft, having a normal position above said weft path, a solenoid connected into one of the shuttle switch solenoid circuits, operatively connected to said lever to swing it upon the completion of alternate picks to a position below said weft in the absence of a weft pick, means carried by said lever for opening said stop motion switch when said lever reaches a position below said weft path, the movement of said lever to said stop motion switch opening position being inhibited by the resistance of a weft pick when present in the path of movement of said lever, said picker stick solenoid circuits having gaps actuated by the picker stick operating motors for alternately closing and opening said gaps, said shift switch normally closing the gap of that picker stick solenoid circuit which is next to be closed by the operation of said source switch.

15. A loom including oppositely reciprocable shed-forming means flexibly connected at their lower ends about a direction changer whereby when one is lifted the other is depressed, fluid pressure motors individual to said shed-forming means, for alternately lifting them, a lay, picker sticks at opposite ends of said lay, fluid pressure motors individual thereto for alternately operating said picker.sticks, said fluid pressure motors each comprising a cylinder, a piston therein having a connection to the device which it operates, and a control valve, the valves of all the motors being connected to a common source of fluid under pressure, individual solenoids for operating said valves, said shed-forming motor solenoids being in circuits including shuttle-operated switches at opposite ends of the lay, alternately closed by the shuttle when in its end positions on the lay, circuits including said picker stick motor solenoids, each shuttle switch circuit and the opposite picker stick solenoid circuit having a common terminal, a switch connected to a source of electrical energy, operatively related to both common terminals, and alternately actuated by the shed-forming means motors, when operated, to supply current to one or the other of said common terminals, said source switch normally contacting the common terminal which includes the shed-forming motor solenoid circuit next to be closed by the shuttle, said picker stick solenoid circuits having gaps, a shift switch commonly related to said gaps, alternately acuated by the picker stick operating motor for alternately closig and opening said gaps, said shift switch normally closing the gap of that picker stick solenoid circuit which is next to be closed by the operation of said source switch, said shed-forming means operating motors and said picker stick operating motors being respectively arranged in pairs, on opposite sides of the source switch and shift switch and having push rods movable with the pistons into operative contact with said switches.

16. In a loom, shed-forming means, beat-up means, picking means, and a lay, fluid pressure motors individual to said several means, and electro-magnets individual to said motors for actuating them, said electro-magnets being in a circuit system connected to a source of electrical energy for activating said electro-magnets in proper sequence and co-ordination, responsive to control by the shuttle, a stop motion including a normally closed switch in the connection to the electrical source, a weft fork normally positioned above a recess in the weft path on said lay, a solenoid connected into the circuit of one shed-forming means, a solenoid for drawing said weft fork periodically against the weft pick bridging said recess and in the absence of a weft pick drawing said fork into said recess, said weft fork being operatively connected to said switch to open the same, when drawn into said recess.

ENEAS G. MASCARENHAS.